United States Patent
Pora et al.

(10) Patent No.: US 12,234,772 B2
(45) Date of Patent: Feb. 25, 2025

(54) SYSTEM FOR SUPPLYING FUEL TO A TURBOMACHINE

(71) Applicant: SAFRAN AIRCRAFT ENGINES, Paris (FR)

(72) Inventors: Loïc Pora, Moissy-Cramayel (FR); Huguette De Wergifosse, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1025 days.

(21) Appl. No.: 16/480,974

(22) PCT Filed: Jan. 29, 2018

(86) PCT No.: PCT/FR2018/050199
§ 371 (c)(1),
(2) Date: Jul. 25, 2019

(87) PCT Pub. No.: WO2018/138454
PCT Pub. Date: Aug. 2, 2018

(65) Prior Publication Data
US 2020/0003123 A1    Jan. 2, 2020

(30) Foreign Application Priority Data

Jan. 30, 2017 (FR) .................................. 1750743

(51) Int. Cl.
*F02C 7/232* (2006.01)
*F02C 7/236* (2006.01)
(Continued)

(52) U.S. Cl.
CPC .............. *F02C 7/232* (2013.01); *F02C 7/236* (2013.01); *F02C 7/32* (2013.01); *F02C 9/30* (2013.01);
(Continued)

(58) Field of Classification Search
None
See application file for complete search history.

(56) References Cited

U.S. PATENT DOCUMENTS

| 5,813,611 A * | 9/1998 | Cires ....................... F02K 1/004 239/265.37 |
| 7,130,750 B1 * | 10/2006 | Stevens ..................... G01F 1/24 73/861.58 |

(Continued)

FOREIGN PATENT DOCUMENTS

| EP | 3 051 103 A1 | 8/2016 |
| FR | 2 934 321 A1 | 1/2010 |
| FR | 3 035 155 A1 | 10/2016 |

OTHER PUBLICATIONS

International Search Report mailed May 25, 2018, issued in corresponding International Application No. PCT/FR2018/050199, filed Jan. 29, 2018, 4 pages.

*Primary Examiner* — Arun Goyal
*Assistant Examiner* — William L Breazeal
(74) *Attorney, Agent, or Firm* — Christensen O'Connor Johnson Kindness PLLC

(57) ABSTRACT

The present disclosure relates to a system for supplying fuel to a turbomachine. In some embodiments, a fuel circuit includes a pressurisation valve at an outlet of the system and a pump. The circuit may include a flow rate sensor arranged between the outlet of the pump and the pressurisation valve. In some embodiments, the flow rate sensor may include a sliding drawer, a restoring spring, and a sensor for detecting the position of said drawer in order to indicate the flow passing through the flow rate sensor. The system may include a device arranged to drive the pump with a controllable rotational speed and a control configured to control the (Continued)

device on the basis of a measurement supplied by the flow rate sensor, in such a way as to adapt the rotational speed of the pump shaft.

6 Claims, 4 Drawing Sheets

(51) Int. Cl.
  *F02C 7/32* (2006.01)
  *F02C 9/30* (2006.01)
(52) U.S. Cl.
  CPC ............... *F05D 2260/40311* (2013.01); *F05D 2270/02* (2013.01); *F05D 2270/3013* (2013.01); *F05D 2270/3061* (2013.01)

(56) References Cited

U.S. PATENT DOCUMENTS

| | | | | |
|---|---|---|---|---|
| 2010/0018182 A1* | 1/2010 | Bader | ........................ | F02C 7/32 |
| | | | | 318/400.01 |
| 2016/0061053 A1* | 3/2016 | Thomassin | ............. | F01D 17/06 |
| | | | | 415/69 |
| 2016/0186670 A1* | 6/2016 | Oba | ........................ | F02C 9/263 |
| | | | | 417/15 |

* cited by examiner

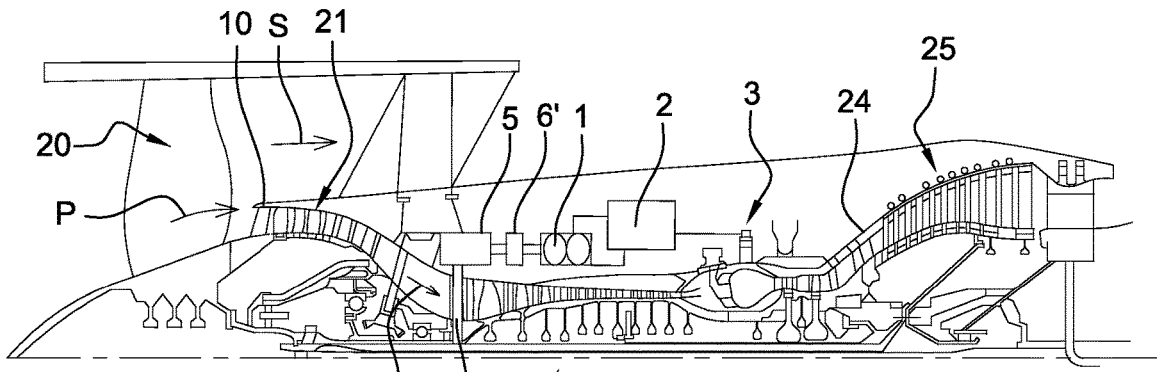
Fig. 3
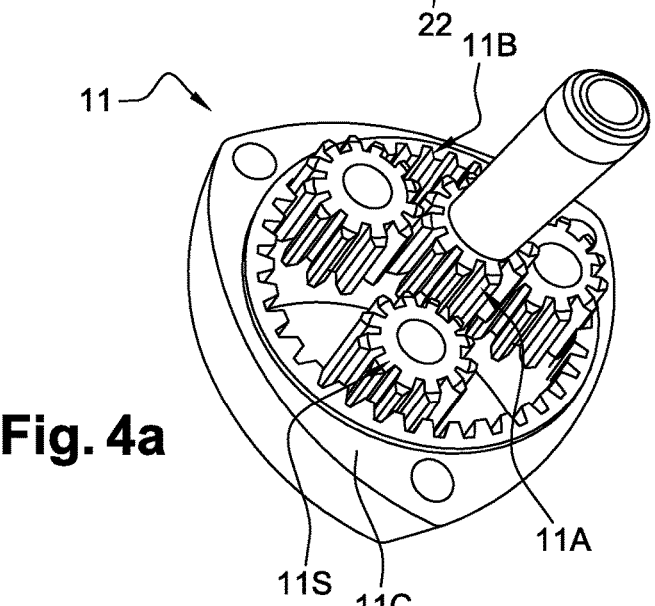
Fig. 4a
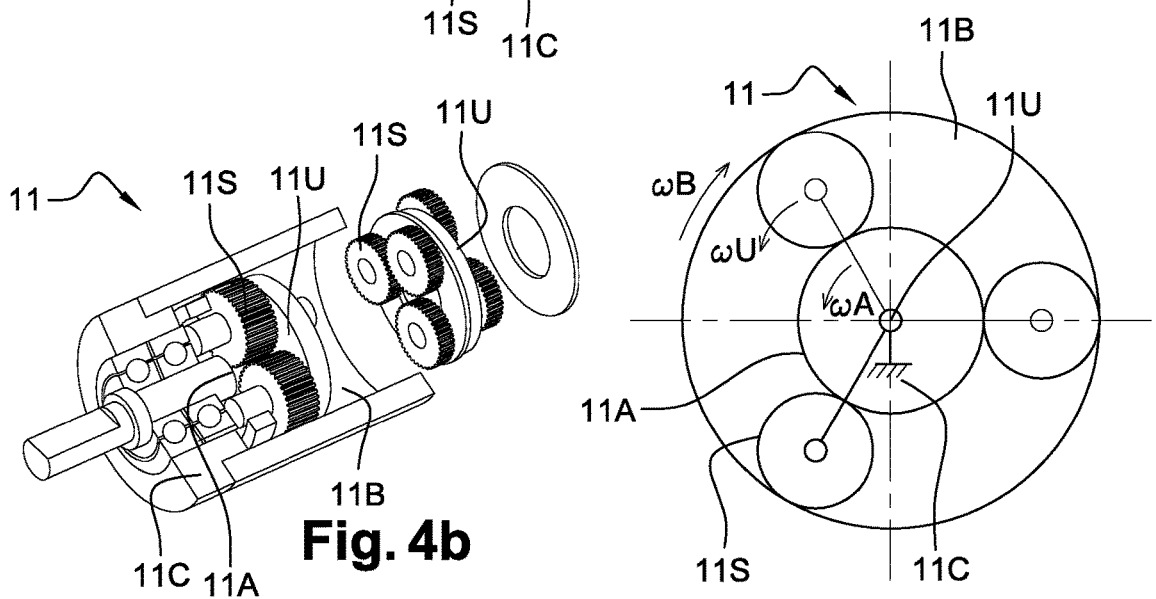
Fig. 4b
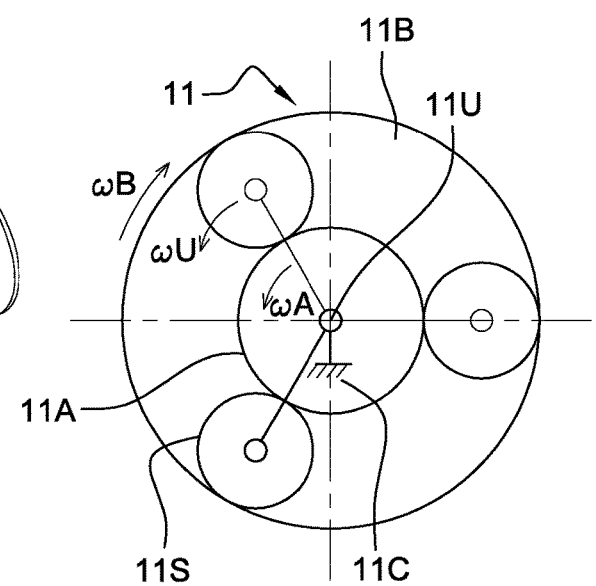
Fig. 4c
Fig. 4

SYSTEM FOR SUPPLYING FUEL TO A TURBOMACHINE

FIELD OF INVENTION

This invention relates to the field of turbomachines. It concerns more particularly the fuel supply system and the regulation of the fuel flow rate in this circuit.

BACKGROUND OF THE INVENTION

The prior art includes in particular patent applications published under the numbers FR-A1-2 934 321, EP-A1-3 051 103 and FR-A1-3 035 155.

Turbomachines installed on an aircraft are equipped with a circuit for supplying fuel, delivering fuel to the combustion chamber, which must be regulated as required according to flight conditions. With reference to FIG. 1, the fuel circuit generally includes a main high-pressure pump 1 of volumetric type that sends fuel to a hydromechanical group 2 before injection to the combustion chamber 3. The assembly is arranged to ensure, at the outlet to the combustion chamber, a fuel flow rate adapted to the need. A control box 4 usually controls the hydromechanical group 2 so that it adapts the flow rate sent by the pump 1 to the need of the combustion chamber 3.

Generally, the pump 1 is driven by an outlet shaft of the accessory box 5 of the turbomachine, itself driven by an axle of the primary body of the turbomachine, not shown in FIG. 1. A drive device 6 is usually installed between the shaft of the accessory relay box 5 and the pump 1 to adapt the rotational speeds between these two devices. This device determines a ratio K between the speed of the pump 1 and the rotational speed $\omega$ of the turbomachine drive shaft. This device usually also drives a means 7 for supplying the circuit from the fuel tanks 8.

The linear characteristic Cyl of the pump 1 between the fuel flow rate and its driving speed depends in particular on its displacement. The pump 1 must be dimensioned in such a way that this displacement allows delivering the flow rates required for all the operating speeds of the turbomachine i.e. the speed of the outlet shaft of the accessory relay box 5, both at low speed and at high speed.

As can be seen in FIG. 2, representing the flow rate variations F as a function of the rotational speed $\omega$ of the drive shaft of the turbomachine, the fuel requirement F1 varies non-linearly as a function of the turbomachine speed. The rotational speed $\omega$ of the drive shaft of the turbomachine varies between a minimum value $\omega$min, for the ignition of the turbomachine, and a maximum value $\omega$max for the take-off. The speed corresponding to a cruise flight falls between these two extremes.

According to the application, the crucial point is located either at low speed ignition or at take-off, at high speed. In FIG. 2, this crucial point is located at the ignition level, the displacement of the pump must be chosen in such a way that its linear characteristic is equal to the Cyl1 value, to ensure enough flow rate during all flight conditions. This Cyl1 value can be significantly higher than the minimum Cylmin value required under certain flight conditions, or even the Cyl2 value required during take-off.

According to this dimensioning, the flow rate provided by the pump therefore follows the line L1 on the flow rate/rotation speed diagram of FIG. 2. During a large phase of driving speed, especially in cruise flight, the pump therefore delivers a flow rate higher than the fuel flow rate requirement, thus a fuel surplus F2.

The hydromechanical group 2 must therefore return to the pump, through a recirculation loop 9, the fuel surplus F2 compared to the need.

This fuel flow rate regulation problem is further emphasized when the fuel system is used, as shown in FIG. 1, to actuate variable geometries 10 of the turbomachine. The actuation of variable geometries 10 creates variations in fuel requirement in the circuit that must be considered in the dimensioning of the pump 1, in the operation of the hydromechanical group 2 and in the characteristics of the recirculation loop 9.

This architecture of the fuel supply system has several disadvantages. The flow rate surplus injected by the pump 1 induces a surplus of power drawn on the accessory relay box 5 compared to the need, which is detrimental to the efficiency of the turbomachine. The mechanical power surplus transforms into thermal power dissipated in the recirculation loop 9, which must be evacuated. This has a negative influence on the size and mass of the fuel circuit, especially for unrepresented heat exchangers placed to dissipate heat in this circuit.

It is therefore important to adapt the flow rate of the pump 1 to the different operating points of the turbomachine in order to gain power drawn from the accessory relay box 5, which is not allowed with the state-of-the-art drive device 6.

In addition, a hydromechanical group 2 according to the state of the art, not detailed in the figure, is generally composed of:
- a metering unit controlled by a servo valve whose position is controlled by a position sensor;
- a regulating valve, sending the flow rate surplus delivered by the pump into the recirculation loop 9, and regulating the pressure difference across the metering unit;
- a stop valve, controlled by a servo valve allowing to pressurize the fuel system and to cut the injection.

For the hydromechanical group 2 to operate properly, recirculation is required to ensure a pressure difference across the metering unit, regardless of whether variable geometries 10 are activated or not.

Thus, the sizing of the pump 1 is normally carried out by considering a flow rate surplus equal to the sum of the system leaks, the minimum flow rate required to regulate the pressure difference across the metering unit and the flow rate related to the movements of the variable geometries 10.

This flow rate surplus can represent between 60 and 95% of the total flow rate dimensioning the pump 1, considering the diagram in FIG. 2.

Assuming that the problem of adapting the rotational speed of the pump according to the operating points of the turbomachine has been solved, a conventional fuel circuit requires this last flow rate surplus. It therefore does not allow to reach the maximum power gain made possible by a possible adaptation of the speed of the pump 1

The purpose of the invention is to propose a solution that allows to take more optimal advantage of a power gain allowed by adapting the pump speed to the fuel need of the turbomachine for its various operating points.

DISCLOSURE OF THE INVENTION

For this purpose, the invention concerns a fuel supply system of a turbomachine, comprising a fuel circuit comprising pressurization means at the outlet of said circuit, a pump arranged to send into said circuit a fuel flow rate which is an increasing function of the rotational speed of a shaft of said pump, characterized in that the circuit includes a flow rate sensor placed between the outlet of the pump and the pressurization means, the flow rate sensor comprising a sliding drawer, a return mean and a sensor for detecting the position of said drawer, the position of said drawer being controlled by a pressure difference across the flow rate sensor shaped to compensate for the force applied by the return mean to said drawer, the circuit being arranged so that the position of said drawer indicates the flow rate passing through the flow rate sensor, in that the system comprises a device arranged to drive the pump with a controllable rotational speed, and in that the system comprises means arranged so as to control the device on the basis of a measurement provided by the flow rate sensor, so as to adapt the rotational speed of the shaft of the pump to respect a flow rate setpoint value at the outlet of the fuel circuit.

With the flow rate measurement, the system can adapt the speed of the pump to provide an appropriate flow rate if necessary. Therefore, the system optimally takes advantage of the ability of its drive system to vary the pump speed and minimizes the power drawn to supply the combustion chamber with fuel.

Another advantage is that in established speed, the flow rate provided by the pump being adapted, there is no recirculation flow rate, as in a conventional solution. In addition, this fuel circuit can do without a metering unit, the function of which is provided by the flow rate sensor and means, generally electronic, to control the drive system device of the pump.

In addition, the concept allows to remove components of the hydromechanical group according to the state of the art, such as the regulating valve and a servo valve for controlling the metering unit, which represents a mass saving.

In addition, it allows the use of certified components or the upgrading of an existing installation.

The fuel system may include a control loop intended to actuate variable geometries of the turbomachine, said control loop starting with a branch connection on a derivation located between the outlet of the pump and the flow rate sensor.

The operation of the system is particularly well suited to this case. When the variable geometries are activated, the flow rate sensor placed after the derivation toward the actuators sees a decrease in flow rate, which forces the control means of the drive device to increase the pump speed to increase the flow rate to supply the injection chamber and maintain the pressure for the actuators, cooperating for that with the pressurization valve.

Advantageously, the drive device is intended to drive the pump from a drive shaft of said turbomachine and is arranged to vary the ratio between the rotational speed of the shaft of the pump and the speed of the drive shaft.

Preferably, the drive device comprises an epicyclic gear reducer comprising three elements, a central sun gear, an outer ring and a planet carrier, whose planets mesh with the sun gear and the ring gear, a first of the three elements being intended to be connected to the drive shaft and a second of the three elements being intended to be coupled to a shaft of the pump, characterized in that said three elements are movable in rotation about an axis of the reducer, in that said drive device further comprises at least first electrical means arranged so as to rotatably drive the third of said elements of the reducer, in such a way as to modify a rotational speed ratio between the first and second of said elements.

This solution has many advantages. It allows, among other things, to use the reducer necessary to provide the right reduction ratio between the drive shaft and the pump to vary the pump speed.

Preferably the drive device comprises second electrical means coupled to the first or second of said elements of the reducer, the first and second electrical means being arranged to transfer electrical power reversibly from one to the other.

This solution allows a gain on the power drawn for the operation of the pump by a power transfer between the first and second electrical means.

The invention also concerns a turbomachine comprising a system according to one of the preceding claims.

Advantageously, an accessory relay box is placed between the drive shaft and the drive device.

The invention also concerns a method for regulating a fuel pump for such a turbomachine in an aircraft, characterized in that it implements control laws of the rotational speed of the shaft of the pump, which increase or respectively decrease this speed when the flow rate indicated by the sensor decreases or increases, so that the flow rate and pressure at the outlet of the circuit are adapted to the flight conditions of the aircraft.

Advantageously, when the supply system is used to actuate variable geometries, said control laws are arranged to also adapt the flow rate provided by the pump and the pressure in the circuit to the conditions of use of the variable geometries.

BRIEF DESCRIPTION OF THE FIGURES

This invention shall be better understood, and other details, characteristics and advantages of this invention shall appear more clearly when reading the description of the following non-limiting example, with reference to the annexed drawings on which:

FIG. 3 very schematically shows a half section of a turbomachine that can use the invention;

FIG. 4 shows exploded views and a diagram for an epicyclic gear reducer that can be used by the invention;

Figure 1:
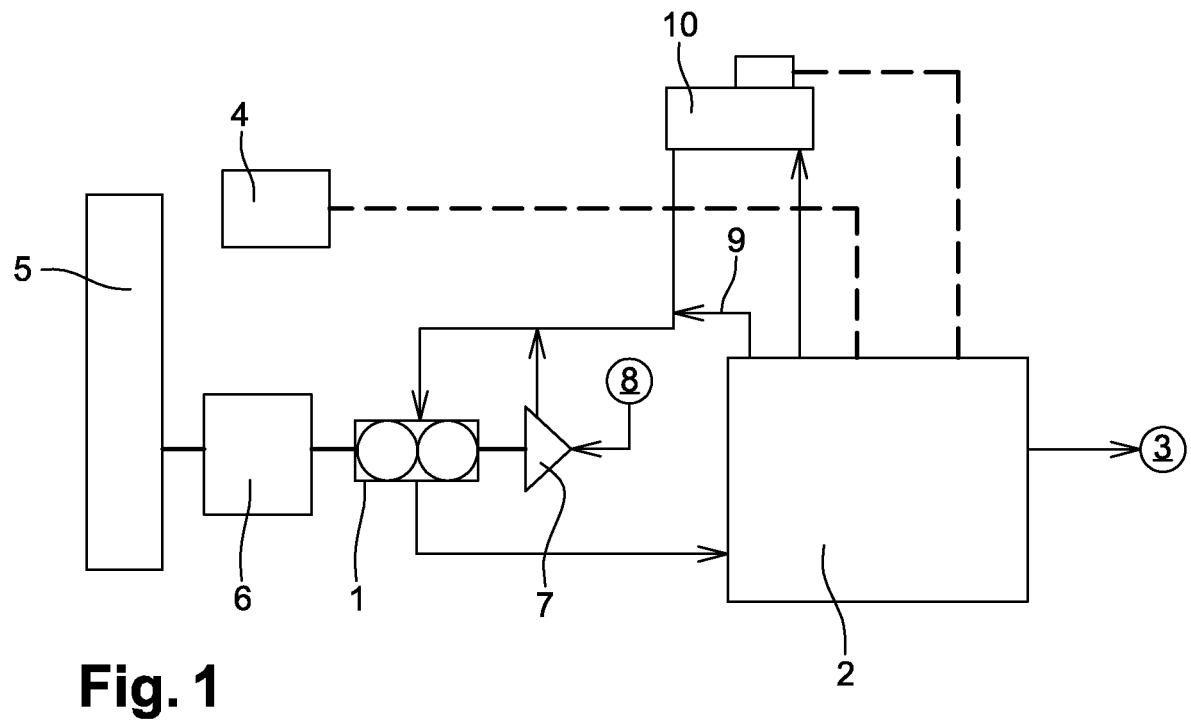
FIG. 1 very schematically shows a fuel circuit according to the state of the art.

The elements having the same functions in the different embodiments have the same references in the figures.

DESCRIPTION OF AN EMBODIMENT

In a turbomachine, for example a dual flow turbomachine shown in FIG. 3, the outlet air flow at fan 20 is divided into a primary flow P entering the engine and a secondary flow S surrounding the latter. The primary flow then passes through low-pressure compressors 21 and high-pressure compressors 22, the combustion chamber 3 supplied by the fuel circuit mentioned previously, and then high-pressure turbines 24 and low-pressure turbines 25. Generally, all the high-pressure compressors 22 and high-pressure turbines 24 rotate as a unit on a common axis 26 and form the engine part of the turbomachine with the combustion chamber.

Generally, the drive shaft 26 drives the accessory relay box 5 which can include several gear trains connected to outlet shafts to drive various equipment units. Here one of the outlet shafts of the gearbox drives, by a drive device 6', the volumetric pump 1 which supplies the hydromechanical group 2 injecting the fuel into the combustion chamber 3. Generally also, the accessory relay box makes the connection between the drive shaft 26 and a starter/generator, not shown in this figure, which can be used to drive the turbomachine during the start-up phases or generate an electric current when the turbomachine is on.

The turbomachine may also have variable geometries 10, mentioned above, which can be activated under certain conditions of use. This variable geometries 10 are, for example, variable-pitch vanes at the inlet of a low-pressure compressor.

Figure 6:
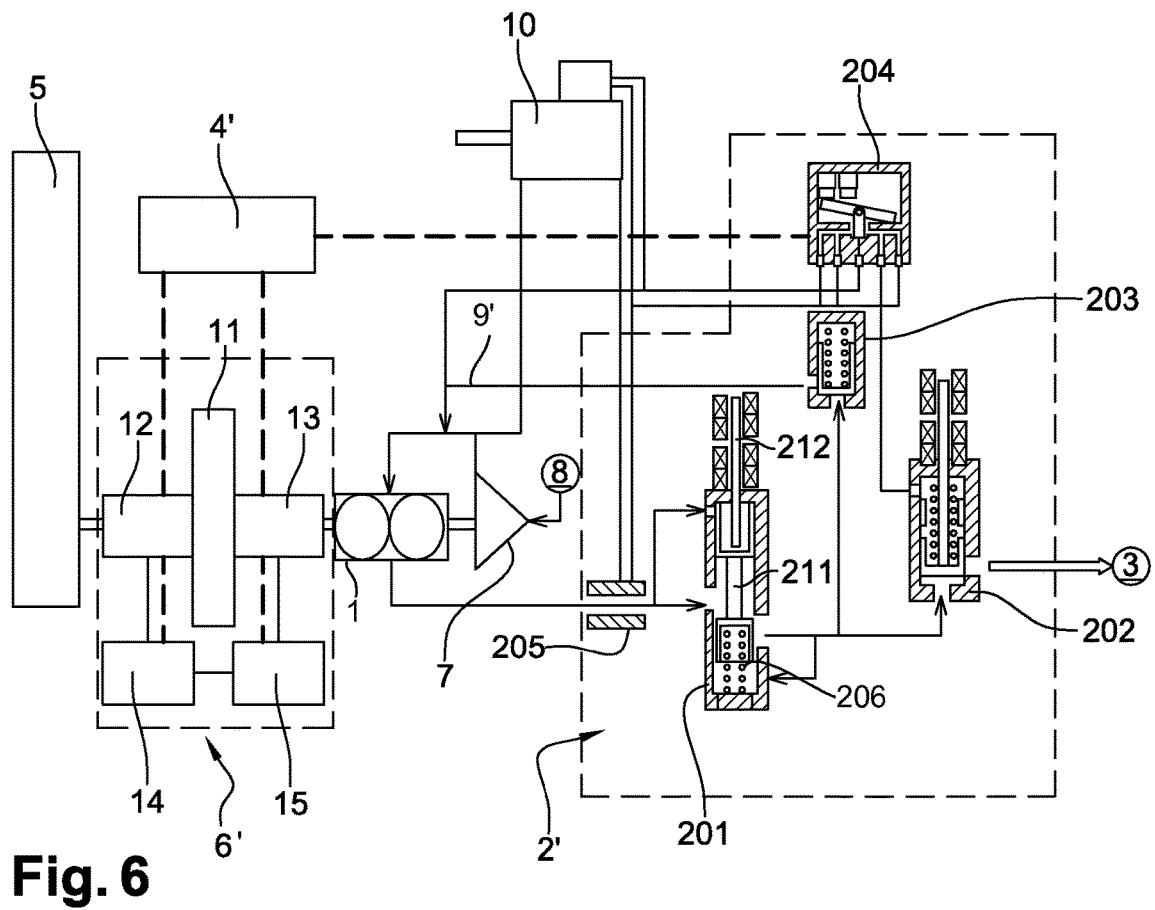
FIG. 6 very schematically shows a first fuel system configuration using the device from FIG. 5.
Figure 7:
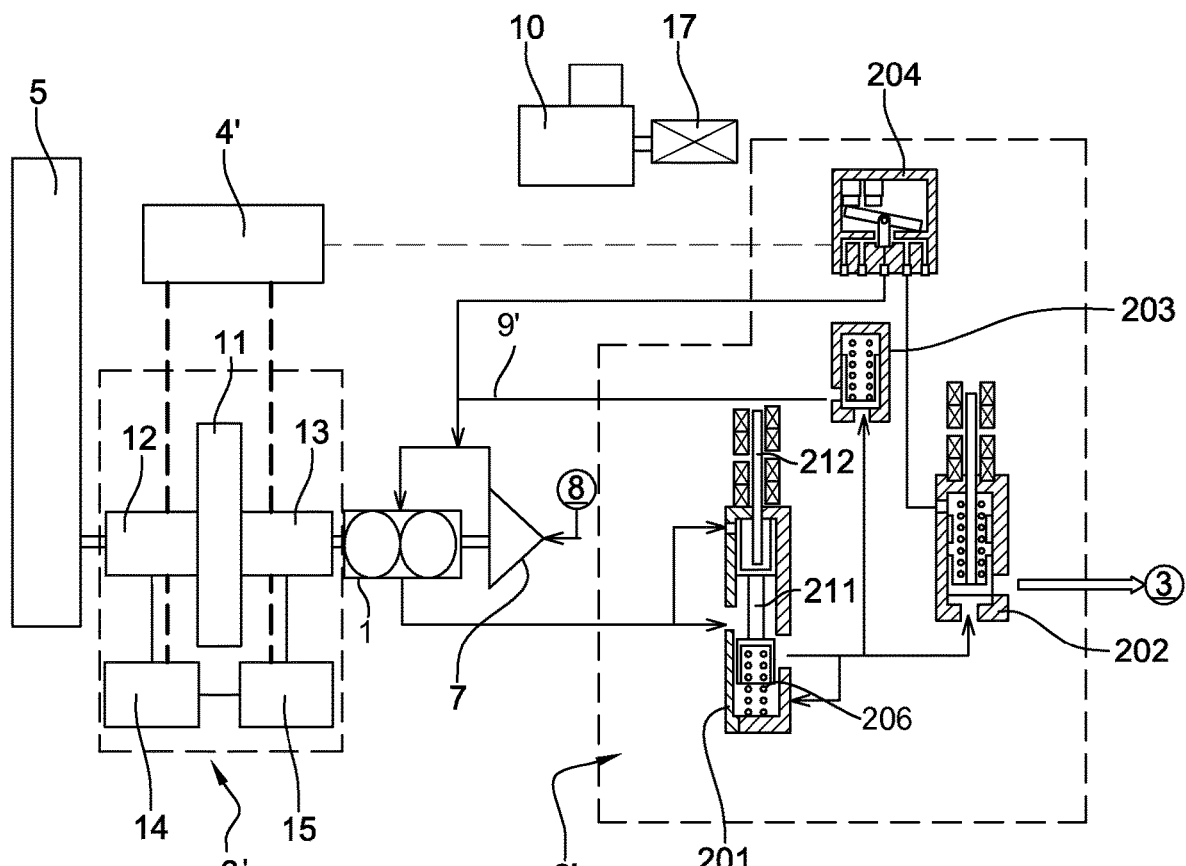
FIG. 7 very schematically shows a second fuel system configuration using the device from FIG. 5.

Here, with reference to FIG. 6 or 7, the fuel supply system includes a drive device 6' between the accessory relay box 5 and the pump 1 different from that of the system in FIG. 1. The pump 1 can be of the same nature as the conventional solution. It is a rotary volumetric pump, whose flow rate is an increasing function of the rotational speed $\omega 1$, able to provide the flow rate necessary for the injection into the combustion chamber 3 and to pressurize the fuel circuit. Preferably, it has a linear characteristic Cy1 relating the outlet flow rate to the rotational speed $\omega 1$.

First of all, we will show that there is at least one solution to make a drive device 6' capable of varying the ratio between the rotational speed of the shaft of the accessory relay box 5 and the rotational speed of the shaft of the pump 1, in order to be able to adapt the speed of the pump 1 to the different operating points of the turbomachine.

The drive system 6' shown has an epicyclic gear reducer whose properties are used to adapt the rotational speed of pump 1 to the need for fuel flow rate according to the different operating speeds of the turbomachine.

With reference to FIG. 4, the epicyclic gear reducer 11 comprises:

- a central sun gear 11A, arranged to be able to rotate about the axis of the epicyclic gear at a speed $\omega A$;
- planets 11S meshing with the central sun gear 11A and carried by a planet carrier 11U, the planet carrier 11U being arranged to be able to rotate about the axis of the epicyclic gear at a speed $\omega U$;
- an external ring gear 11B with which the planets 11S also mesh, the ring gear 11B being arranged to be able to rotate about the axis of the epicyclic gear at a speed $\omega B$.

A characteristic of the epicyclic gear reducer 11 is therefore that its three elements, the central sun gear 11A, the planet carrier 11U and the ring gear 11B, are able to rotate.

Here, for example, the ring gear 11B is free to rotate inside a fixed casing 11C protecting the reducer 11.

The operation of the epicyclic gear of the reducer 11 is governed by Willis equation, which shows that it is a two degrees of freedom mechanism and that the knowledge of the rotational speeds of two elements among the central sun gear 11A, the planet carrier 11U and the ring gear 11B, allows the calculation of the rotational speed of the third.

Rotation of the central sun gear 11A: $\omega A$
Rotation of the planet carrier 11U: $\omega U$
Rotation of the ring gear 11B: $\omega B$ $$(\omega A - \omega U)/(\omega B - \omega U) = k \quad \text{or} \quad \omega A - k^* \omega B + (k-1)^* \omega U = 0 \quad \text{WILLIS Equation:}$$

In Willis equation, the factor k, also called the epicyclic gear reason, is a constant determined by the geometry of the gears. For the reducer 11 in FIG. 4, $k = -ZB/ZA$, where ZA is the number of teeth of the central sun gear A and ZB the number of teeth of the ring gear B. The factor k is therefore negative with a modulus lower than 1.

It is therefore understood that, if the outlet shaft of the accessory relay box 5 is coupled to one of the three elements and the shaft of the pump 1 is coupled to a second element, the rotational speed of the pump 1 can be varied for a given speed of the shaft of the box 5 by varying the rotational speed of the third element.

A first electric motor 12 is coupled to said third element to control the rotational speed of the latter.

Six combinations are possible to position the three equipment units, accessory relay box 5, pump 1 and electric motor 12, with respect to the three elements of the epicyclic gear reducer 11.

A second motor 13 is also coupled to one of the elements of the reducer 11 which is not connected to the first motor 12. The position of the second motor 13 doubles the number of possible combinations for the device 6'. This results in twelve combinations listed in the table below.

This table also indicates the function giving the speed $\omega 1$ of the pump 1 from the speed $\omega 5$ of the shaft of the box 5 and the speed $\omega 12$ of the first motor 12. The rotational speed $\omega 13$ of the second motor 13 is determined by the rotational speed of the equipment with which it is coupled in series on the reducer 11, either the shaft of the pump 1 or the outlet shaft of the box 5. In this table, option 1 corresponds to the cases where the second motor 13 is coupled in series with the pump 1 on the same element of the reducer 11, and option 2 corresponds to cases where the second motor 13 is coupled in series with the outlet shaft of the accessory relay box 5 on the same element of the reducer 11.

TABLE 1

| Connection box/pump/first motor | | Pump speed | Connection second motor | |
|---|---|---|---|---|
| Box 5 connected to the planet carrier 11U | | | | |
| | Motor 12 | Pump 1 | | Option 1 | Option 2 |
| 1A | ring gear 11B | sun gear 11A | $\omega 1 = (1 - k)^*\omega 5 + k^*\omega 12$ | sun gear A | planet carrier 11U |
| 1B | sun gear 11A | ring gear 11B | $\omega 1 = -\omega 5^*(1 - k)/k + \omega 12/k$ | ring gear B | planet carrier 11U |
| Box 5 connected to the ring gear 11B | | | | |
| | Motor 12 | Pump 1 | | Option 1 | Option 2 |
| 2A | planet carrier 11U | sun gear 11A | $\omega 1 = k^*\omega 5 + (1 - k)^*\omega 12$ | sun gear A | ring gear B |
| 2B | sun gear 11A | planet carrier 11U | $\omega 1 = -\omega 5^*k/(1 - k) + \omega 12/(1 - k)$ | planet carrier 11U | ring gear B |

TABLE 1-continued

| Connection box/pump/first motor | | | Pump speed | Connection second motor | |
|---|---|---|---|---|---|
| Box 5 connected to the sun gear 11A | | | | | |
| | Motor 12 | Pump 1 | | Option 1 | Option 2 |
| 3A | ring gear 11B | planet carrier 11U | $\omega1 = \omega5/(1 - k) - \omega12*k/(1 - k)$ | planet carrier 11U | sun gear A |
| 3B | planet carrier 11U | ring gear 11B | $\omega1 = \omega5/k - \omega12*(1 - k)/k$ | ring gear B | sun gear A |

Figure 5:
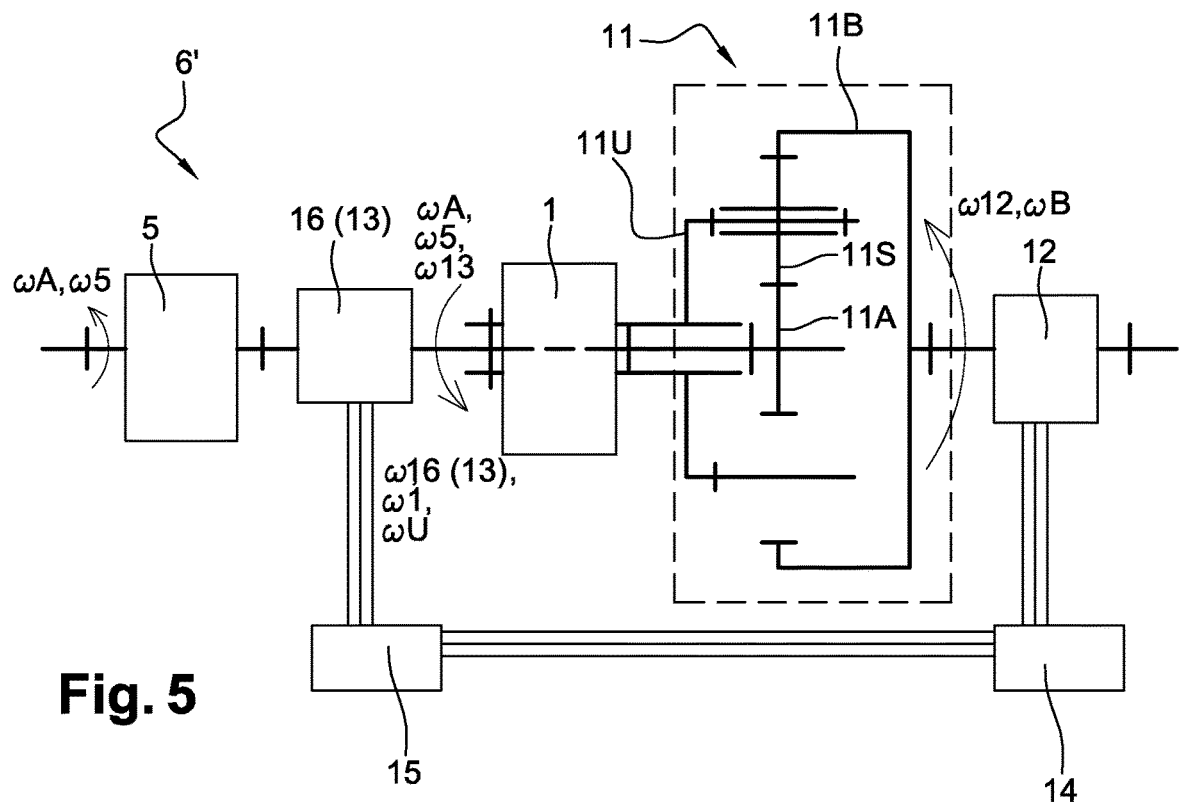
FIG. 5 shows the diagram of an example of a drive device of the pump using a reducer from FIG. 4.

In the example shown in FIG. 5, corresponding to the configuration "3A—Option 1", the box 5 is connected to the central sun gear 11A, the pump to the planet carrier 11U, the first electric motor 12 is connected to the ring gear 11B, so that it can drive in rotation the latter, and the second motor 13 is connected to the planet carrier 11U.

The first motor 12 and the second motor 13 each have a stator and a rotor. Said motors 12, 13 are controllable in terms of torque applied to their rotor and rotational speed $\omega12$, $\omega13$ of their rotor. These are, for example, alternative current asynchronous motors. The torque and speed of each motor 12, 13 are then controlled by the electrical power and the frequency of the current sent by a converter 14, 15 dedicated to each.

In addition, the second motor 13 is electrically connected to the first motor 12 through said reversible voltage converters 14, 15, in order to pass power from one to the other.

In addition, with reference to FIG. 6 or 7, the fuel supply system also differs from that in FIG. 1 in that the control box 4' is connected to the converter 14, to control the speed $\omega12$ and the torque of the first motor 12 in order to adapt the speed $\omega1$ of the pump 1, and to the converter 15, to control the torque of the second motor 13 to manage the power transfer between the two motors.

The dynamic study of the reducer 11 shows that the torque CA acting on the sun gear 11A, the torque CB acting on ring gear 11B and the torque CU acting on planet carrier 11U are related by two relationships:

$$CA+CB+CU=0 \quad \text{(epicyclic gear equilibrium)}$$

$$\omega A*CA+\omega B*CB+\omega U*CU=0 \quad \text{(dynamic equilibrium)}$$

Considering the relationships relating the rotational speeds of these elements, it is possible to calculate the torques acting on two elements of the reducer 11 knowing the third one.

The second motor 13, being connected in series with the pump 1 or the box 5, has its rotational speed determined as being equal to that of this equipment unit.

It is however understood that it provides an additional degree of freedom to the system according to the torque it exerts, which is added to that of the pump 1 or the box on the corresponding element of the reducer 11.

This additional degree of freedom can be used to ensure power transfer with the first motor: either providing power when the first motor 12 intervenes to accelerate the pump 1 with respect to the drive of the box 5, or absorbing power when the first motor 12 intervenes to brake the pump 1.

Figure 2:
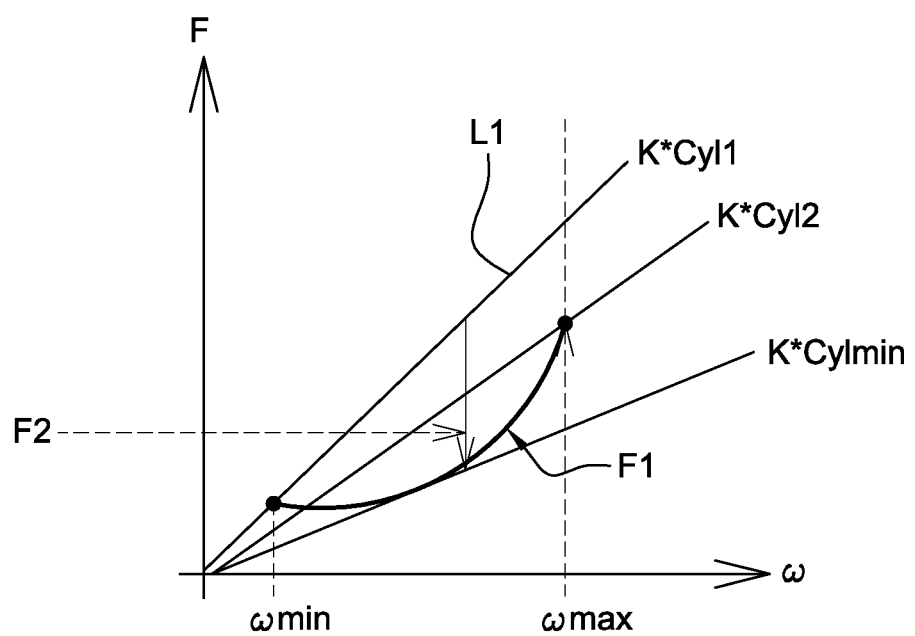
FIG. 2 shows a speed and flow rate diagram showing the difference between the flow rate provided by the fuel pump and the requirement for a circuit as shown in FIG. 1.

It is possible to use other configurations than that illustrated in FIG. 5. The choice depends on the operating characteristics of the turbomachine. The choice of parameters of the device such as the factor k of the epicyclic gear reducer 11, the ratio of the rotational speed $\omega5$ at the outlet of the box 5 with respect to the rotational speed of the axle of the turbine, the linear characteristic Cyl of the pump 1, and the choice among the configurations 1A to 3B, must be made to achieve in particular the following objectives:

allowing the pump 1 to rotate at a speed $\omega1$ that adjusts to provide a flow rate Cyl.$\omega1$ that corresponds to the need F1, as shown for example in FIG. 2, when the rotational speed of the axle of the turbine varies between its minimum value $\omega min$ and maximum value $\omega max$;

minimizing the power spent in the motor 12 to adjust the speed w1 of the pump 1 to the operating range of the turbomachine.

In addition, technological constraints on the equipment units used generally imply that:

the speed $\omega1$ of the pump 1 must be lower than that $\omega5$ of the outlet shaft of the accessory relay box 5; and the speed $\omega12$ of the electric motor 12 must be limited to a maximum value.

This concept with two auxiliary electric motors for the drive system between the accessory relay box 5 and the pump 1 is very innovative because it offers the following advantages:

taking from the accessory relay box 5 only the mechanical power corresponding to the power requirement for supplying the variable geometries (pressure requirement) and for supplying the fuel flow rate (fuel flow rate requirement), reduction of the displacement of the pump 1, drastic reduction in the dimensioning of the recirculation loop 9' of the pump flow rate, simplification of the architecture of the hydromechanical group 2 for fuel regulation, no need for external power during the controlling of the pump speed by a motor 12 thanks to the power transfer between this motor and the second motor 13.

In the system described above, the first motor 12 and the second motor 13 are especially dedicated equipment units, added to operate the drive device 6'. In a variant, the starter of the turbomachine can be used as the first or second motor of the device.

The fuel supply system concept developed in the following allows optimal use of such a drive device 6'.

With reference to FIG. 6, a fuel supply system, according to the invention, includes:

a drive device 6' between the accessory relay box 5 and the pump 1 as described above, allowing to adapt the speed of the pump 1;

a pump 1 dimensioned to be adapted to the flow rate supplied with the system according to the invention;

a means 7 for supplying the circuit from fuel tanks 8;

a hydromechanical block 2' according to the invention;

a control electronics 4'.

Here, the fuel supply system is also connected to actuators of variable geometries 10.

The hydromechanical block 2' according to the invention includes the following elements:
- a fuel flow rate sensor 201 between the pump 1 and the injection to the combustion chamber 3;
- a pressurization valve 202 at the injection to the combustion chamber 3;
- a return valve 203 branched between the flow rate sensor 201 and the pressurization valve 202, and connected to a recirculation loop 9';
- a servo valve 204 essentially controlling the pressurization valve 202 and the return valve 203.

When the fuel circuit is used to operate variable geometries 10, the fuel circuit advantageously includes a derivation 205 to power a control loop for actuators of the variable geometries 10. This derivation 205 is placed here between the pump 1 and the flow rate sensor 201 of the hydromechanical block 2'.

The flow rate sensor 201 is realized by a modified metering unit.

A metering unit usually used in a conventional circuit includes a sliding drawer 211 whose position controls the flow rate through a metering unit section. In addition, a sensor 212 of the position of the drawer 211 allows to slave the metering unit, usually by a servo valve.

Here, the position of the drawer 211 is not controlled by a servo valve, but directly by the pressure difference across the flow rate sensor 201 which compensates the force applied by a return mean 206, for example a spring, on the drawer 211, similar to the control of the regulating valve of the conventional solution. Knowing the characteristics of the metering unit section and the spring, the position read by the sensor 212 of position of the drawer 211 provides information on the actual flow rate really injected by the fuel circuit into the combustion chamber.

For example, flow rate information can be transmitted to the control electronics box 4' for action on the drive device 6' and so that the latter adjusts the speed of the pump 1 to ensure the correct fuel flow rate adapted to the need.

The hydromechanical block 2' therefore loses its function of regulating the flow rate but ensures a function of flow rate sensor. It keeps the functions of cutting off the fuel and pressurization of the system through the pressurization valve 202.

The pressurization valve 202 ensures the minimum pressure for the correct operation of the variable geometries, as well as the cut-off of the injected flow rate.

The return valve 203, allows ensuring the exhaust of the flow rate delivered by the pump 1 in order not to increase pressure in the circuit, when this cut-off is activated by the servo valve 204.

However, this recirculation only exists during the stop phase, or during preparation for ignition, the duration of the decreasing of the rotation speed of the pump 1. The recirculation loop 9' is therefore much less important than for a conventional circuit.

At ignition, the pump 1 is driven at a minimum rotational speed. A part of the flow rate passes through the sensor 201 and is recirculated by the return valve 203.

The speed of the pump 1 is then adjusted to reach the correct ignition flow rate setpoint value. The servo valve 204 is then activated, which cause the pressurization valve 202 to open, the return valve 203 to close and thus allows the ignition flow rate to be injected into combustion chamber 3.

Finally, the return valve 203 provides protection in the event of overspeed due to a failure of the pump 1 speed control.

In the event of a flow rate call related to the actuation of variable geometries 10, for a given rotational speed of the pump 1, the flow rate passing through the sensor 201 tends to decrease due to the derivation 205 towards the variable geometries 10, which is placed upstream. The information of a decrease in flow rate requires the drive system 6' to accelerate the speed of the pump 1 in order to maintain the correct injected flow rate required.

A control loop based on the flow rate information of the sensor 201, installed in the control box 4', therefore allows the pump speed to be adjusted for any operating point of the turbomachine, whether the variable geometries 10 are active or not.

This hydromechanical block 2' concept therefore allows to take advantage of a drive system 6' capable of adapting the pump's rotation speed if necessary.

There is therefore no longer any need to size a recirculation loop 9' to dissipate a large flow rate surplus and this allows to gain power drawn from the accessory relay box 5 for fuel supply. This also allows to eliminate the regulating valve that exists in a conventional circuit.

In addition, since the metering unit function has been removed, no flow rate surplus is required to operate it.

The hydromechanical block 2' therefore allows to take full advantage of the potential power gain offered by the drive system 6'.

It should be noted that this concept also works without powering variable geometries, for example if they are driven by electrical means 17, as shown in FIG. 7. In a configuration without variable geometries, the solution will only be easier to implement, and more efficient in terms of power gain.

In a preliminary study that was carried out based on a particular type of application, where each operating point is described in terms of speed of the box 5, injected flow rate, cooling flow rate of the variable geometries 10, internal leaks, flow rate required to move the variable geometries and injection pressure, the inventors thus found a significant gain in power required to carry out the injection, whether with or without hydraulic power to the variable geometries.

This concept also has other positive impacts.

Regarding the volumetric pump 1, its displacement can be reduced by at least one third compared to a conventional solution. There is also a gain in the overall dimensions due to the reduction in the diameter of the pinions and a mass gain.

Regarding the hydromechanical block 2', there is a simplification and mass gains in relation to the disappearance of a servo valve, the replacement of a regulating valve by a return valve and the possibility of eliminating an electrovalve.

The concept allows also to reduce the size of heat exchangers.

In addition, with the proposed solution, it is possible to carry out an equipment monitoring action.

To do this, it is enough to add a speed sensor, not shown, to the volumetric pump 1.

Indeed, the sensor 201 indicates the fuel flow rate. Since the volumetric pump 1 has a characteristic linking the rotational speed and the injected flow rate, it is possible, on a stabilized point, or during a fixed motor point in dry ventilation, to control the wear of the pump 1: a too high drift of the flow rate reading at a given pump speed would indicate an increase in leakage in the system, whether at the pump or internal leaks in the fuel system.

The invention claimed is:

1. A fuel supply system of a turbomachine, comprising:
a fuel circuit including a pressurization valve at an outlet of the fuel circuit, a return valve, a servo valve, and a flow rate sensor having an input and an output, the output of the flow rate sensor connected in fluid communication with the return valve and the pressurization valve, wherein the servo valve is arranged to control operation of the pressurization valve;
a pump arranged to send fuel into the fuel circuit at a fuel flow rate, the fuel flow rate an increasing function of a rotational speed of a shaft of the pump, wherein the fuel is supplied to the flow rate sensor from an outlet of the pump,
the flow rate sensor comprising a sliding drawer, a return spring and a sensor for detecting a position of the sliding drawer, the position of the sliding drawer being controlled by a pressure difference across the flow rate sensor which is shaped to compensate for a force applied by the return spring to the sliding drawer, wherein the position of the sliding drawer indicates the flow rate passing through the flow rate sensor,
wherein the fuel supply system further includes an epicyclic gear arrangement arranged to drive the pump with a controllable rotational speed, and a control that controls the epicyclic gear arrangement based on a measurement provided by the flow rate sensor, wherein the rotational speed of the shaft of the pump adapts to a flow rate setpoint value at the outlet of the fuel circuit,
wherein the epicyclic gear arrangement drives the pump from a drive shaft of the turbomachine and is arranged to vary a ratio between the rotational speed of the shaft of the pump and a rotational speed of the drive shaft,
wherein the epicyclic gear arrangement comprises an epicyclic gear reducer comprising three elements, a central sun gear, an outer ring gear, and a planet carrier, whose planets mesh with the central sun gear and the outer ring gear, a first of the three elements being connected to the drive shaft and a second of the three elements being coupled to the shaft of the pump, wherein the three elements are movable in rotation about an axis of the epicyclic gear reducer, wherein the epicyclic gear arrangement further comprises at least a first electrical motor arranged to rotatably drive a third of the three elements of the epicyclic gear reducer, to modify a rotational speed ratio between the first of the three elements and second of the three elements, and
wherein the epicyclic gear arrangement comprises a second electrical motor coupled to the first of the three elements or the second of the three elements of the epicyclic gear reducer, the first electrical motor and second electrical motor being configured to transfer electrical power reversibly from one to the other.

2. The fuel supply system according to claim 1, wherein the fuel circuit includes a control loop to actuate a variable geometry component of the turbomachine, the control loop starting with a branch connection on a derivation located between the outlet of the pump and the flow rate sensor.

3. A turbomachine comprising the fuel supply system according to claim 1.

4. A method for regulating the pump for the turbomachine according to claim 3 in an aircraft, the method comprising the step of implementing control laws of the rotational speed of the shaft of the pump, which increase or respectively decrease the rotational speed when the flow rate indicated by the flow rate sensor decreases or increases, causing the flow rate and pressure at the outlet of the fuel circuit are adapted to flight conditions of the aircraft.

5. The method according to claim 4, wherein the control laws are configured to also adapt the flow rate provided by the pump and the pressure in the fuel circuit to operational conditions of a variable geometry component.

6. A fuel supply system of a turbomachine, comprising:
a pump having a shaft to be driven in rotation;
a fuel circuit including a pressurization valve at an outlet of the fuel circuit, wherein the pump is arranged to send fuel into the fuel circuit at a fuel flow rate, the fuel flow rate an increasing function of a rotational speed of a shaft of the pump, wherein the fuel circuit includes:
a flow rate sensor disposed in fluid communication between an outlet of the pump and the pressurization valve, the flow rate sensor comprising a sliding drawer, a return spring and a position sensor for detecting a position of the sliding drawer, the position of the sliding drawer being controlled by a pressure difference across the flow rate sensor which is shaped to compensate for a force applied by a return spring to the sliding drawer, wherein the position of the sliding drawer indicates the fuel flow rate passing through the flow rate sensor;
an epicyclic gear arrangement arranged to drive the shaft of the pump with a controllable rotational speed, and a control that controls the epicyclic gear arrangement based on a measurement provided by the flow rate sensor, wherein the rotational speed of the shaft of the pump adapts to a flow rate setpoint value at the outlet of the fuel circuit,
wherein epicyclic gear arrangement drives the shaft of the pump from a drive shaft of the turbomachine and is arranged to vary a ratio between the rotational speed of the shaft of the pump and a rotational speed of the drive shaft,
wherein the epicyclic gear arrangement comprises three gear elements, a central sun gear, an outer ring gear, and a planet carrier carrying planets, the planets mesh with the central sun gear and the outer ring gear, a first of the three elements is connected to the drive shaft of the turbomachine and a second of the three elements is coupled to the shaft of the pump,
wherein the epicyclic gear arrangement further comprises a first electrical motor arranged to rotatably drive the third of the three elements of the epicyclic gear arrangement in order to modify a rotational speed ratio between the first of the three elements and the second of the three elements, and a second electrical motor coupled to the first of the three elements or the second of the three elements of the epicyclic gear arrangement, the first electrical motor and second electrical motor being configured to transfer electrical power reversibly from one to the other.

* * * * *